Feb. 14, 1956  T. F. COURTHOPE ET AL  2,734,804
SALT DISSOLVING APPARATUS
Filed May 26, 1950
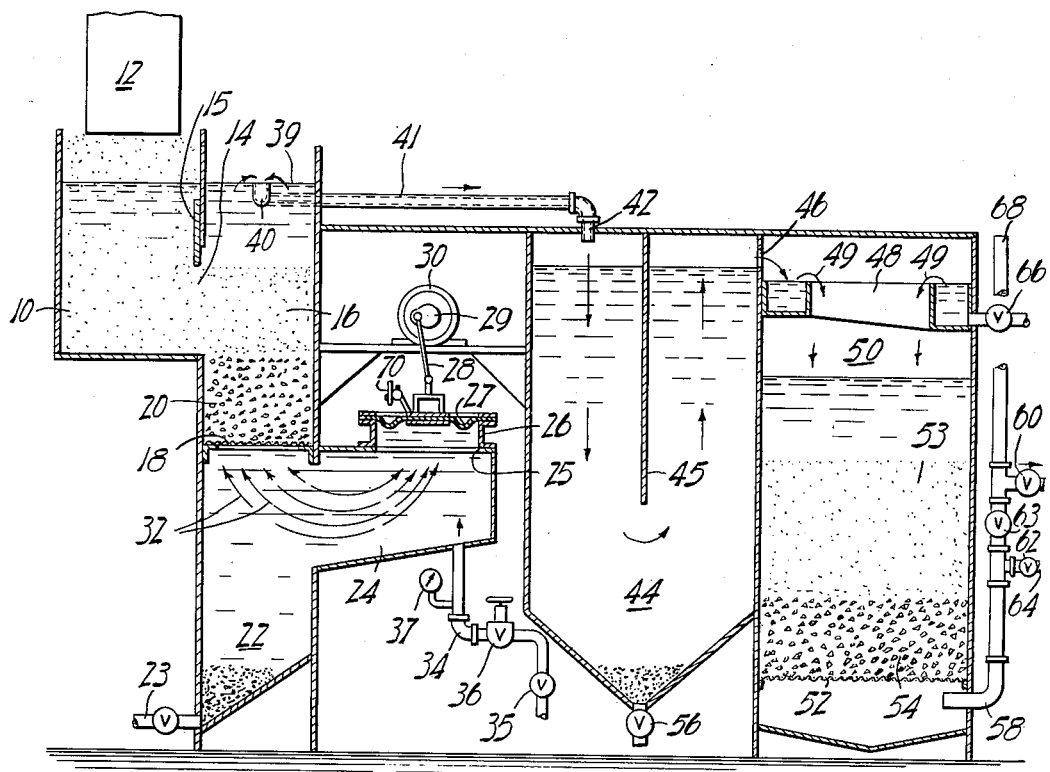
INVENTORS
Thomas F. Courthope
Stanley Martin and
Robert G. Sickley
BY
Bean, Brooks, Buckley & Bean
ATTORNEYS

United States Patent Office

2,734,804
Patented Feb. 14, 1956

2,734,804
SALT DISSOLVING APPARATUS

Thomas F. Courthope, Geneseo, Stanley Martin, Retsof, and Robert G. Sickly, Geneseo, N. Y., assignors to International Salt Company, Scranton, Pa.

Application May 26, 1950, Serial No. 164,514

5 Claims. (Cl. 23—272.6)

This invention relates to apparatus for dissolving rock salt or evaporated salt into brine; the present invention embodying improvements over the apparatus disclosed in our prior Patent No. 2,281,140.

It is well known that a major impurity in rock salt comprises calcium sulfate in the form of the mineral anhydrite particles, which are relatively insoluble in water compared to sodium chloride; and that it is essential that such relatively insoluble particles be prevented from being taken into the brine solution if the latter is to be used for example in the manufacture of certain chemicals or for other industrial uses.

The prior patent referred to hereinabove disclosed an "up-flow" type dissolver embodying means for pulsating the dissolution water through the feed salt bed, and a screen device for supporting the salt bed with a view to permitting shale and calcium sulfate particles to settle through the screen and thence into a settling chamber from whence it could be removed at intervals. However, it has been determined that such apparatus is incapable of optimum results because the screen device thereof is necessarily fine enough to hold the salt thereon with the result that the particles of relatively insoluble calcium sulfate and shale are also caught on the screen and in time "blind" the screen. In fact, only at the beginning of a run, subsequent to dumping of the screen device of the prior patent referred to, will the finest insolubles settle through the screen prior to "blinding" of the screen with intermediate sized insoluble particles. From then on, until the screen is again dumped it is blinded and retains the in-feeding calcium sulfate particles which rapidly accumulate in increasing concentrations in the salt bed, whereby the up-flowing dissolution water leaches out an increasing percentage of calcium sulfate, which is carried into the brine.

The rate of leaching of the calcium sulfate in the dissolution water or brine is of course a function of the length of time of contact and of the speed of dissolution liquid flow, as well as the degree of concentration of the sulfate particles in the salt bed. Further, it is generally known that the rate of leaching of calcium sulfate particles in the dissolution liquid is also a function of the degree of saturation of the brine in contact therewith; and that calcium sulfate for example is more soluble in brine than in water but is most soluble in brine ranging for example between 50% to 80% saturation. Therefore, it follows that in order to produce a purer brine without substantial sulfate content, it is necessary to remove the feed-in sulfate particles from contact with the dissolution liquid as quickly as possible when the latter is within the range of 50% to 80% saturation condition.

Thus, whereas prior dissolution devices required to be periodically purged of their calcium sulfate or other "insoluble" accumulations, with consequent waste of time and labor and undesirable intermittent operation effects; such machines were capable only of producing brine of varying quality because intermediately of each impurity "dumping" operation the feed salt bed was of progressively increasing impurity concentration whereby such impurities were also leached out and entered the brine product so that the products of such machines were unacceptable for use in processes requiring uniformly high purity brines.

Furthermore, the apparatus disclosed in our prior Patent No. 2,281,140 was also deficient because it would not operate satisfactorily on the finer sizes of salt or unscreened salt; because the finer particles thereof simply fell through the screen device into the settling chamber portion therebelow with consequent prohibitive wastage. Still another disadvantage of such prior art devices resided in the fact that the salt feed arrangement thereof disposed the in-feeding salt to pour downwardly on top of the salt bed through which the dissolution water was "pulsed"; and it has been determined that in such arrangements the weight of salt on top of the salt bed substantially blocked the pulsing effect and thereby rendered the machine inefficient from a rate of production standpoint.

The primary object of the present invention is to avoid the disadvantages and difficulties referred to hereinabove, and to provide a salt dissolving apparatus which is adapted to operate continuously while producing a uniformly high purity brine; the relatively insoluble impurity substances such as calcium sulfate which are customarily found in rock salt as mined, having been automatically and continuously segregated from the pure brine producing particles without operator-attention.

Another object of the invention is to provide an improved pulsator type dissolver apparatus.

Still another object of the invention is to provide a novel salt dissolver apparatus providing a feed-in salt bed of uniform depth which is supported in a body of dissolution liquid in novel manner, and whereby the dissolution liquid is pulsated and flows upwardly through the salt bed while relatively insoluble impurities contained in the feed-in salt material are permitted to settle continuously through the dissolving salt bed and downwardly into a settling chamber therebelow, in novel and improved manner.

Other objects and advantages of the invention will appear from the specification hereinafter.

The present invention contemplates a salt dissolver apparatus comprising a chamber containing an upwardly flowing body of dissolution liquid such as water; a bed of feed-in salt being supported in such body of liquid by novel means preventing settling loss of fine salt particles therethrough while at the same time permitting settling therethrough of relatively insoluble impurity particles such as shale or sulfate particles, or the like. Furthermore, the invention contemplates an apparatus as aforesaid which embodies an improved salt feed-in arrangement whereby the feed salt is prevented from piling up on top of the dissolving salt bed to such depth as to cause effective blocking of the pulsing of dissolution liquid therethrough. The invention accomplishes the above set forth objects through use of a bed of substantially permanently insoluble crushed stone or gravel or the like; such crushed stone or gravel being preferably of irregular particle shape and sizes, and supported upon a relatively coarse screen which is of only sufficient fineness to support the crushed stone or gravel particles while being at the same time of sufficiently large size as to readily pass without "blockading or blinding" the largest particles of insoluble material which are mingled with the feeding salt. Furthermore, the objects of the invention are attained by arranging for the feeding salt to move laterally from a separate supply compartment through a partition wall opening onto the crushed stone support, whereby the load of salt on top of the dissolving salt bed portion of the device is maintained uniformly at an efficient dissolving level while precluding any effective damping or blockading of the pulsating action of the apparatus.

In the accompanying drawing, Fig. 1 is a side elevational view of one example of a commercial form of apparatus of the invention; and referring now particularly to the form of the invention illustrated in the drawing, the apparatus comprises a salt feed hopper 10 arranged to receive salt from a chute or the like as indicated at 12. The hopper 10 is formed with an open side wall portion 14, the upper level of which is regulated by a vertically adjustable gate 15. Next adjacent the feed hopper 10 is the dissolving chamber 16 in which is mounted a horizontal screen 18 of wire mesh or the like supporting a bed of crushed limestone or the like as indicated at 20. The feed opening 14 of the hopper 10 is arranged to let salt flow into the dissolving chamber on top of the stone bed 20, as will be explained more fully hereinafter.

The dissolving chamber 16 includes below the position of the screen 18 a sediment chamber 22 with a valve controlled clean out conduit 23 which is normally closed so as to render the feed hopper and dissolving chamber portions water-tight. The dissolving chamber 16 may also include a branch as shown at 24 which is apertured as indicated at 25 and fitted thereat with a collar 26 mounting a flexible diaphragm 27 attached to a connecting rod 28 which is driven by a crank 29 of a motor device 30; whereby operation of the latter causes the diaphragm to reciprocate so as to impose pressure pulsations upon the liquid within the dissolving chamber as indicated diagrammatically by the arrows designated 32.

A feed water inlet conduit 34 is arranged in communication with the dissolving chamber, and is arranged to be controlled by a hand valve 35 and a pressure regulating valve 36. Thus, when the valve 35 is opened and the regulating valve 36 adjusted to proper pressure as indicated by gauge 37, the inlet feed water will flow into the dissolving chamber and thence upwardly through the gravel and salt bed portions 20, 16 and thence on up to a top water level as indicated at 39 which is determined by the position of the intake portion 40 of a drain pipe 41 leading to a position of discharge 42 into one side of a settling chamber 44. The settling chamber is baffled as indicated at 45, and thus the liquid flowing from the drain pipe 41 follows the flow path of the arrows, first downwardly and then upwardly around the baffle 45; leaving therebehind any relatively heavy solids particles suspended in the brine. The brine then passes through a discharge orifice 46 which delivers the liquid into an annular launder 48. The liquid overflows the inner peripheral wall portion of the launder 48 as indicated by the arrows 49 into the top of a filtration chamber 50 in the bottom of which is disposed a screen 52 supporting a bed of filtering medium for removing fine suspended solids from the liquid so as to produce a "crystal clear" brine.

It is of course contemplated that any suitable filtering material may be employed to provide the filter bed; but it has been determined by tests that a filter bed made for example in the form of a top layer 53 comprising relatively fine crushed activated anthracite coal known in the trade as "No. 1 Anthrafilt"; and a bottom layer 54 comprising more coarsely sized material such as the product known in the trade as "No. 3 Anthrafilt," will provide a very acceptable brine clarifying action. The settling chamber 44 is arranged to be periodically cleaned of sediment accumulations therein through means of a valve controlled conduit 56; and a brine outlet conduit 58 is arranged in communication with the bottom portion of the filtration chamber to withdraw filtered brine from the beds 53—54 for conveyance through a brine delivery control valve 60.

The conduit 58 also connects to a wash water feed inlet 62, and control valves 63—64 are provided for use in connection with filter bed back-washing operations. Thus, it will be appreciated that whenever the filter beds 53—54 become loaded with filtered out solids, the beds may be back-washed by first closing the feed water valve 35 and then opening the wash water valve 64 while closing the valve 63. Thus, a supply of wash water will force valve through the conduit 58 into the bottom of the filtration chamber and thence upwardly through the filter beds 53—54 so as to raise the level of liquid in the filtration chamber to the top level of the launder 48. Thus, the debris flushed out of the filter beds will be carried upwardly into the launder 48, whereupon a discharge control valve 66 is opened to permit the debris to flow away to a sewer. As illustrated at 68, the upper end of the conduit 58 is extended at least to the top level of the chambers 44—53 so as to prevent syphoning effects in the conduit 58 incidental to change overs from back-washing to "run" operations.

Thus, it will be appreciated that upon opening of the feed water control valve 35 and opening of the brine discharge control valve 60, the fresh feed water will flow slowly upwardly through the screen 18 and thence through the bed 20 of crushed stone and the salt bed 16; thereby converting into brine flowing upwardly and thence into the intake 40 from which it is delivered into one side of the settling chamber 44. Here the brine flows first downwardly and then upwardly around the baffle 45 and in the process thereof the relatively heavy suspended solids in the brine are segregated and settle out into the form of a sediment accumulation in the bottom of the chamber 44 for periodic removal through the valve 56. The somewhat clarified brine then flows through the orifice 46 into the launder 48 from whence it is dispersed into the top portion of the filtration chamber 50, whereupon it slowly filters downwardly through the filter beds 53—54 and thence passes into the brine outlet conduit 58 for delivery through the valve 60. Thus, passage of the brine through the filter beds 53—54 removes the suspended light weight solids from the brine which do not settle out in the chamber 44; and thus a crystal clear brine is delivered through the valve 60.

It is a special feature and advantage of the present invention that a pulsator device as indicated at 27 is employed in conjunction with the screen and crushed stone support arrangement for the salt bed 16 in the dissolving chamber, because it is by reason of this combination of elements that new and important advantages are obtained in the salt dissolver art. As explained hereinabove, the crushed stone bed 20 preferably comprises angularly shaped stone particles so sized as to provide interstices between the stone particles which are somewhat larger than the largest particles of the salt feed material flowing laterally from the bin 10 into position on top of the stone bed 20. Inasmuch as it is the nature of such particles to run into piles at substantial angles of repose, it is a fact that unless agitation is present a layer of relatively coarse crushed stone as indicated at 20 will support a body of even finer sized salt thereon without substantial settling of the salt particles through the rock bed interstices. However, it has now been determined that whenever a granular salt mass is thus supported upon a stone bed while immersed within a pulsating dissolution liquid, the salt granules are thereby agitated and "lubricated" by the surrounding liquid and gradually work their way downwardly through the passages in the stone bed. It appears that the flow of the liquid through the stone bed operates to set up therein a continuous "working" of the stone bed with consequent minor relative movements of adjacent stone particles, whereby the supported salt granules are enabled to creep downwardly through the stone bed such as would not occur if the stone and salt beds were not immersed in liquid.

Thus, it will be appreciated that in the apparatus of the present invention means are provided for effecting slow but steady downward infiltration of the salt feed material through the crushed stone bed 20. Also, the apparatus includes means to provide a steady current of feed water to move upwardly through the stone bed and in intimate contact with the salt particles as they work their way downwardly through the stone bed and as they lie on top of the stone bed. Thus, the upflowing current of water takes sodium chloride into solution and this brine ultimately reaches the top of the dissolving chamber and flows into the conduit 41 for subsequent settling and filtering clarification. It is furthermore an important feature and advantage of the invention that by reason of the novel arrangement thereof, the stone bed 20 may be adequately supported upon a screen as indicated at 18 which is of such coarse mesh as to readily pass therethrough any particles of sizes up to and including the largest sized particles in the salt feed material. Consequently, any particles of shale or other insoluble or slowly soluble material, such as particles of anhydrite, for example, will work their way down through the stone bed 20 and will then pass freely through the screen 18 into the settling chamber portion 22 for withdrawal through the drain 23. Thus, such insoluble or slowly soluble materials are not retained either upon the screen 18 or within the stone bed 20 in such manner as would clog the latter and hold the anhydrite particles in contact with the upflowing water which enters the brine product. Thus, the apparatus of the present invention constitutes a marked improvement over the apparatus of our prior patent referred to hereinabove wherein the salt bed supporting screen element operated to retain all relatively insoluble particles and required periodic "dumping," intermediately of which the upflowing liquid came into intimate contact with progressively increasing concentrations of anhydrite materials and therefore leached undesirable amounts of such substances into the product brine.

It is another particular feature and advantage of the invention that due to the pulsating action within the liquid the feed salt material does not retain its normal angle of repose but flows laterally from the bin 10 through the opening 14 into position on top of the stone bed 20 from which point it gradually works downwardly through the stone bed as explained hereinabove. Thus, the depth of the load of salt feed material on top of the stone bed may be maintained constantly at the depth which will be found in practice to provide adequate salt to feed-water contact to provide a fully saturated brine solution while at the same time avoiding overload pressures on top of the salt bed such as would be experienced for example if the delivery chute 12 were to be disposed above the salt bed portion 16. Such an arrangement would result in substantial damping of the liquid pulsing action within the stone bed 20; and thus in the case of the present invention effective "working" of the stone bed 20 in response to the liquid pulsing action is permitted, while at the same time arranging for adequate salt to feed-water contact for production of a fully saturated brine.

Thus, it will be appreciated that in the case of the present invention there will be no necessity for periodic dumping of the screen device 18 because there is no accumulation of insoluble material on the screen, and that it is a particular advantage of the apparatus of the invention that the more slowly soluble anhydrite particles which may be of any size up to the size of the largest particles in the rock salt as mined and crushed, it will be passed through the stone bed at such rate as will preclude any appreciable leaching thereof into the product brine. Hence, the apparatus of the invention produces not only a higher purity brine, but also produces brine continuously and without interruption at uniformly high purity as long as the apparatus is in operation. The selection of the particle sizes of the stone bed 20 will of course be determined by the sizing of the salt feed materials; and the regulation of the valve 36 and of the rate of pulsation of the diaphragm 27 will be controlled in any case to provide a balanced and smooth flowing continuous operation for producing the desired degree of brine concentration up to a fully saturated brine product without wastage loss of salt particles into the sediment accumulations in the chamber 22.

It has also been determined that in order to produce a substantially purer brine by passing dissolution water through salt of the type including, for example, calcium sulfate in the form of anhydrite, it is essential to remove the anhydrite particles away from contact with the dissolution water or brine as quickly as possible and especially when the contact therebetween occurs under conditions wherein the brine exists at from 50% to 80% concentration. It appears that the anhydrite referred to is most soluble when in the presence of a brine of from 50% to 80% concentration; and therefore it follows that in an apparatus of the type of the invention it is essential that the anhydrite particles be permitted to move relatively rapidly through the salt bed retaining device so as to avoid lengthy contact therein with the upflowing brine which is then at a stage of partial concentration. The apparatus of the present invention meets this requirement ideally because of the manner in which the stone bed and screen device pass the impurity particles as explained hereinabove.

It will be appreciated of course that any suitable device may be employed in lieu of the specific diaphragm arrangement as illustrated and described hereinabove, for the purpose of obtaining liquid pulsating effects. Also, that any other suitable dissolution liquid feed-in arrangement may be employed instead of the arrangement as shown in the drawing. The term dissolution liquid is used herein to refer to whatever liquid is employed to produce the desired brine; and thus it will be appreciated that although the dissolution liquid may in many cases comprise fresh water it might also for example take the form of partially spent brine returning from some point of use and requiring replenishment to bring it up to required strength. It is another feature of the arrangement as illustrated that the disposition of the pulsator device in a horizontal branch portion of the settling chamber provides for an effective pulsating action while at the same time avoiding disturbance of the sediment accumulations in the bottom of the chamber 22. An air bleed valve 70 is preferably provided in connection with the diaphragm 27 as shown in the drawing so as to permit removal of air tending to become trapped under the diaphragm; thus maintaining the diaphragm in positive working contact with the liquid to be pulsated.

Whereas, only one specific form of apparatus embodying the invention has been illustrated and described herein in detail, it will be apparent to those skilled in the art that the invention is not so limited but that various changes may be made therein without departing from the spirit of the invention or the scope of the appended claims.

What is claimed is:

1. An apparatus for producing brine from a supply of relatively soluble granular salt including quantities of less soluble granule impurities in the same granular size range, said apparatus comprising a feed material receiving chamber having a settling compartment portion in the bottom thereof, a feed material support bed of substantial depth comprising a mass of discrete particles of solvent-inert material, said particles being of such sizes and forms as to provide interstices therebetween adapted to pass the largest granules of said supply salt and impurities therethrough, said bed being supported upon a screen mounted in said material receiving chamber at a position above the settling compartment portion thereof, said screen being sized to freely pass the largest granules of said supply salt and impurities but to retain said inert bed material, a brine outlet device adjacent the top of said chamber at a level above said bed, solvent liquid supply means discharging into said chamber at a position so as to provide an upflow current of solvent liquid through said bed toward said brine outlet device, liquid pulsator means bearing against the liquid in said chamber for pulsating the liquid flowing upwardly through said support bed, and clean out means at the botom of said settling compartment portion permitting removal therefrom of settled material.

2. An apparatus for producing brine from a supply of relatively soluble granular salt including quantities of less soluble granule impurities in the same granular size range, said apparatus comprising a feed material receiving chamber having a settling compartment portion in the bottom thereof, a feed material support bed comprising a mass of discrete particles of solvent-inert material, said particles being of such sizes and forms as to provide interstices therebetween adapted to pass the largest granules of said supply salt and impurities therethrough, said bed being supported upon a screen mounted in said material receiving chamber at a position above the settling compartment portion thereof, said screen being sized to freely pass the largest granules of said supply salt and impurities but to retain said inert bed material, a brine outlet device adjacent the top of said chamber at a level above said bed, solvent liquid supply means discharging into said chamber at a position so as to provide an upflow current of solvent liquid through said bed toward said brine outlet device, means for pulsating the contents of said support bed, and clean out means at the bottom of said settling compartment portion permitting removal therefrom of settled material.

3. An apparatus for producing brine from a supply of relatively soluble granular salt including quantities of less soluble granule impurities in the same granular size range, said apparatus comprising a feed material receiving chamber having a settling compartment portion in the bottom thereof, a feed material support bed of substantial depth comprising a porous mass of solvent-inert material, said mass being so constituted as to provide passageways therethrough adapted to permit slow passage of the largest granules of said supply salt and impurities therethrough, said bed being mounted in said material receiving chamber at a position above the settling compartment portion thereof, a brine outlet device adjacent the top of said chamber at a level above said bed, solvent liquid supply means discharging into said chamber at a position so as to provide an upflow current of solvent liquid through said bed toward said brine outlet device, means for pulsating the liquid flowing upwardly through said support bed, and clean out means at the bottom of said settling compartment portion permitting removal therefrom of settled material.

4. An apparatus for producing solution from a supply of relatively soluble granular solute including quantities of less soluble granule impurities in the same granular size range, said apparatus comprising a feed material receiving chamber having a settling compartment portion in the bottom thereof, solvent liquid supply means discharging into said chamber, a feed material support bed of substantial depth comprising a mass of discrete particles of solvent-inert material, said particles being of such sizes and forms as to provide interstices therethrough adapted to pass the supply solute and impurities therethrough, said bed being supported upon a screen device mounted in said material receiving chamber at a position above the settling compartment portion thereof, said screen device being sized to freely pass said supply solute and impurities but to retain said inert bed material, a solution outlet device adjacent the top of said chamber, means for pulsating the contents of said support bed, and clean out means at the bottom of said settling compartment portion permitting removal therefrom of fine particles of settled material, the interstices of said feed material supporting bed and of said screen device being sized to pass the largest granules of said impurities.

5. An apparatus for producing solution from a supply of relatively soluble granular solute including quantities of less soluble granule impurities in the same granular size range, said apparatus comprising a feed material receiving chamber having a settling compartment portion in the bottom thereof, a feed material support bed of substantial depth comprising a porous mass of solvent-inert material providing devious passageways therethrough sized to permit slow rate passage of the largest granules of said supply solute and of said impurities therethrough, said bed being mounted in said material receiving chamber at a position above the settling compartment portion thereof, a solution outlet device adjacent the top of said chamber at a level above said bed, solvent liquid supply means discharging into said chamber at a position so as to provide an upflow current of solvent liquid through said bed toward said solution outlet device, means for pulsating the contents of said support bed to effect slow rate passage of said impurities through said support bed, and clean out means at the bottom of said settling compartment portion permitting removal therefrom of solid materials passed through said bed and settled at the bottom of said settling compartment.

References Cited in the file of this patent

UNITED STATES PATENTS

| | | |
|---|---|---|
| 1,500,096 | Oxley | July 1, 1924 |
| 2,281,140 | Courthope | Apr. 28, 1942 |
| 2,468,162 | Black | Apr. 26, 1949 |